(12) United States Patent
Haas

(10) Patent No.: US 10,549,733 B2
(45) Date of Patent: Feb. 4, 2020

(54) METHOD AND CONTROL UNIT FOR RECOGNIZING CRITICAL DRIVING SITUATIONS OF A TWO-WHEELED MOTOR VEHICLE

(71) Applicant: Robert Bosch Gmbh, Stuttgart (DE)

(72) Inventor: Hardy Haas, Ditzingen-Schoeckingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/348,707

(22) PCT Filed: Oct. 5, 2017

(86) PCT No.: PCT/EP2017/075287
§ 371 (c)(1),
(2) Date: May 9, 2019

(87) PCT Pub. No.: WO2018/095634
PCT Pub. Date: May 31, 2018

(65) Prior Publication Data
US 2019/0283722 A1    Sep. 19, 2019

(30) Foreign Application Priority Data

Nov. 23, 2016 (DE) .......................... 10 2016 223 070

(51) Int. Cl.
*B60T 8/17*    (2006.01)
*B60T 8/1755*    (2006.01)

(52) U.S. Cl.
CPC ........ *B60T 8/1706* (2013.01); *B60T 8/17551* (2013.01); *B60T 8/17552* (2013.01);
(Continued)

(58) Field of Classification Search
CPC combination set(s) only.
See application file for complete search history.

(56) References Cited

U.S. PATENT DOCUMENTS

2013/0168171 A1* 7/2013 Buell ................. B60K 6/46
                                                    180/220
2018/0030910 A1* 2/2018 Rocher ................ G01C 9/00
(Continued)

FOREIGN PATENT DOCUMENTS

DE    102008001970 A1    12/2009
DE    102010003951 A1    10/2011
WO       2014009033 A1     1/2014

OTHER PUBLICATIONS

International Search Report for PCT/EP2017/075287, dated Mar. 2, 2018.

*Primary Examiner* — Redhwan K Mawari
(74) *Attorney, Agent, or Firm* — Norton Rose Fulbright US LLP; Gerard Messina

(57) ABSTRACT

A method/control unit for recognizing critical driving situations of a two-wheeled motor vehicle (MV), including: ascertaining an instantaneous slip angle (ISA) and differential slip angle (DSA) of the front/rear wheels; ascertaining an instantaneous roll angle (IRA); comparing the ascertained SAs and DSAs to predetermined values (PV) of maximum allowable slip angles (MASA) or DSAs; comparing the IRA to PVs of a maximum allowable roll angle (MARA); and generating a criticality signal when one of the ISAs is greater than the PV of the MASA, at least one of the instantaneous DSAs is greater than the PV of the maximum allowable DSA, and the IRA is greater than the PV of the MARA. Critical driving situations are recognized with the method, and measures for stabilizing the two-wheeled MV or other safety-enhancing measures may be performed. Special driving situations (driving over low-µ patches or braking while negotiating a curve) may be considered.

10 Claims, 2 Drawing Sheets

(52) U.S. Cl.
CPC ..... *B60T 2201/16* (2013.01); *B60T 2210/124* (2013.01); *B60T 2230/02* (2013.01); *B60T 2230/03* (2013.01)

(56) References Cited

U.S. PATENT DOCUMENTS

2019/0263460 A1* 8/2019 Haas ................... B60W 40/112
2019/0283722 A1* 9/2019 Haas ................... B60T 8/17551

* cited by examiner

METHOD AND CONTROL UNIT FOR RECOGNIZING CRITICAL DRIVING SITUATIONS OF A TWO-WHEELED MOTOR VEHICLE

FIELD OF THE INVENTION

The present invention relates to a method for recognizing critical driving situations of a two-wheeled motor vehicle. Moreover, the present invention relates to a control unit that is configured for carrying out such a method, and a two-wheeled motor vehicle that is equipped with such a control unit.

BACKGROUND INFORMATION

Motorized vehicles in which a front wheel and a rear wheel are situated in succession, and which are therefore single-tracked, are referred to as two-wheeled motor vehicles, sometimes also as motorcycles. Such single-track vehicles are particularly susceptible to accidents due to their ability to tilt laterally, transversely with respect to the travel direction. It is therefore desirable to recognize critical driving situations early that may result in the two-wheeled vehicle tipping over and thus having a dangerous accident, and to avoid or counteract them or mitigate their consequences.

A frequent cause of accidents with motorized two-wheeled vehicles when negotiating curves, without the involvement of other vehicles, is excessive over- or understeering of the vehicle with lateral skidding of one or both wheels. These situations are caused primarily by excessive curve speeds, excessive acceleration or braking in an inclined position, or by a roadway section with a low friction coefficient between the tires and the roadway, i.e., a so-called low-μ patch. In particular the latter-mentioned case is feared even by experienced motorcyclists.

Extremely effective systems for preventing excessive over- or understeering for two-track vehicles have become widespread in the market, such as vehicle dynamics control systems such as the electronic stability program (ESP®). Instability is recognized by observing a rider intent (setpoint yaw rate, computed from the steering angle) and an actual vehicle response (actual yaw rate). There are also similar strategies with the observation of an estimated sideslip angle β and a wheel slip angle α that is computed from same. When there are distinct differences between setpoint and actual values, corrective measures may be taken via engine and braking interventions.

The driving dynamics are much more demanding for single-track two-wheeled motor vehicles than for two-track passenger vehicles. For example, roll angles Φ are typically in the range of ±50°, while generally smaller roll angles of ±7° occur with recent two-track vehicles. In addition to the demanding driving dynamics, the consequences of exceeding the physical limits are often serious. Thus, even brief instabilities, for example due to a low-μ patch, sometimes result in severe accidents for two-wheeled motor vehicles. A passenger vehicle would only briefly slide or move slightly laterally.

Against the background of comparatively high accident rates, efforts have therefore also been made for two-wheeled motor vehicles, using improved sensor systems and estimation algorithms that make driving dynamics functions for braking and acceleration, which are already present, suitable for negotiating curves. An estimation algorithm for ascertaining the motorcycle sideslip angle and computing the front and rear wheel slip angles for two-wheeled motor vehicles that is thus made possible is currently being developed for mass production.

SUMMARY OF THE INVENTION

Specific embodiments of the present invention may advantageously make it possible to recognize critical driving situations of a two-wheeled motor vehicle with high reliability, for example to be able to initiate measures for avoiding or reducing the degree of severity of an accident in a timely manner, to be able to warn other road users, and/or optionally to be able to request assistance.

According to a first aspect of the present invention, a method for recognizing critical driving situations of a two-wheeled motor vehicle is provided. The method includes at least the following steps: initially an instantaneous slip angle $\alpha_1$ and an instantaneous differential slip angle $d\alpha_1$ of the front wheel, and/or an instantaneous slip angle $\alpha_2$ and an instantaneous differential slip angle $d\alpha_1$ of the rear wheel, are/is ascertained. In addition, an instantaneous roll angle $\Phi$ of the two-wheeled motor vehicle is ascertained. Ascertained instantaneous slip angles $\alpha_1$, $\alpha_2$ and differential slip angles $d\alpha_1$, $d\alpha_2$ are then compared to respective associated predetermined values $\alpha_{1,max}$, $\alpha_{2,max}$, $d\alpha_{1,max}$, $d\alpha_{2,max}$ of maximum allowable slip angles or maximum allowable differential slip angles. Furthermore, instantaneous roll angle $\Phi$ is compared to a predetermined value $\Phi_{max}$ of a maximum allowable roll angle. A so-called criticality signal is generated if at least one of instantaneous slip angles $\alpha_1$, $\alpha_2$ is greater than associated predetermined value $\alpha_{1,max}$, $\alpha_{2,max}$ of the maximum allowable slip angle, at least one of instantaneous differential slip angles $d\alpha_1$, $d\alpha_2$ is greater than associated predetermined value $d\alpha_{1,max}$, $d\alpha_{2,max}$ of the maximum allowable differential slip angle, and instantaneous roll angle $\Phi$ is greater than predetermined value $\Phi_{max}$ of the maximum allowable roll angle. This criticality signal may be an electronic signal, and may then be transmitted, for example, to some other component of the two-wheeled motor vehicle in order to prompt it to initiate suitable measures, for example for stabilizing the vehicle.

According to a second aspect of the present invention, a control unit for a two-wheeled motor vehicle is described, which is configured to carry out a method according to one specific embodiment of the first aspect of the present invention.

According to a third aspect of the present invention, a two-wheeled motor vehicle is described, which includes a control unit according to one specific embodiment of the second aspect of the present invention.

Concepts concerning specific embodiments of the present invention may be regarded as being based, among other things, on the concepts and findings described below.

Specific embodiments of the present invention may include in particular an approach for recognizing instabilities in two-wheeled motor vehicles, based on an improved estimation of variables that are important in driving dynamics, such as slip angle, slip angle change, and roll angle. The slip angle of a wheel of the two-wheeled motor vehicle may be understood as an angle between a velocity vector at the wheel contact point and an intersection line between the wheel center plane and the roadway plane. A time-dependent slip angle change is also referred to as the differential slip angle, i.e., a time derivative of the slip angle. The roll angle of a two-wheeled motor vehicle refers to a tilting change in position of the two-wheeled motor vehicle about its longitudinal axis. Other necessary pieces of input information, such as the steering angle, i.e., an angle between the vehicle longitudinal axis and the steering direction of a steered wheel, and vehicle speed may be suitably measured via sensors.

It has been recognized that, for detecting critical driving situations for a two-wheeled motor vehicle, it may generally be sufficient to ascertain the instantaneous slip angle of at least one of the vehicle wheels, the instantaneous change in this slip angle over time, i.e., the differential slip angle, and the instantaneous roll angle, and to compare these variables to certain predefined limiting values or maximum allowable values. At least when all three ascertained values are simultaneously greater than the respective limiting values, it may be assumed that a critical driving situation, in particular an unstable driving situation, is present or at least imminent, and suitable measures may be initiated by outputting the criticality signal.

When an instability is recognized, for example measures for stabilizing the two-wheeled motor vehicle may be triggered. For example, an intervention into known slip-based traction control system (TCS) and antilock braking system (ABS) controls, generation of additional stabilizing lateral forces, or increasing contact forces is conceivable. Generation of additional forces may take place, for example, by utilizing aerodynamic spoilers or flaps, pyrotechnic recoil forces, ejection of fluids stored in pressurized thanks, or by utilizing gyroscopes. However, functions that, for example, warn other vehicles of a slick roadway (so-called Bike-to-X information), or which in the event of an accident deploy an airbag and/or request assistance (eCall), are also conceivable.

According to one specific embodiment, instantaneous slip angle $\alpha_1$, $\alpha_2$ and instantaneous differential slip angle $d\alpha_1$, $d\alpha_2$ may be ascertained for both the front wheel and the rear wheel. Predetermined value $\alpha_{1,max}$ of the maximum allowable slip angle of the front wheel is increased to a higher value $\alpha_{1,max,incr}$ of a maximum allowable slip angle of the front wheel, provided that ascertained instantaneous slip angle $\alpha_2$ of the rear wheel is smaller than a reduced predetermined value $\alpha_{2,max,decr}$ of the maximum allowable slip angle.

In other words, in many situations $\alpha_2$ may remain in the stable range, i.e., below $\alpha_{2,max,decr}$. Increased value $\alpha_{1,max,incr}$ is used as a threshold value in these situations. If the rear axle then becomes unstable at a high inclined position, the threshold value may be reduced to $\alpha_{1,max}$ immediately, i.e., without filtering time.

This is based on the finding that a two-wheeled motor vehicle negotiating a curve generally behaves differently when the roadway being traveled on has locations with a low friction coefficient, i.e., low-μ patches, than when the roadway being traveled on has a homogeneous friction coefficient. For locally delimited areas with a reduced friction coefficient, normally the front wheel crosses, i.e., enters, such an area first, followed by the rear wheel.

In particular when traveling over a relatively small area with a reduced friction coefficient, moderate to large steering angles and slip angles occur at the front wheel due to the steering kinematics, while the rear wheel has instabilities only for long low-μ patches having a large difference in friction coefficients. It has been observed that moderately large slip angles at the front wheel do not necessarily result in a fall, since the front wheel is often able to restabilize itself if it quickly reaches a roadway surface once again that has good traction.

However, even an instability of brief duration may result in recognition of a presumably critical driving situation, whereupon appropriate interventions into the driving dynamics of the vehicle would be triggered. To avoid such faulty recognition, limiting value $\alpha_{1,max}$ of the maximum allowable slip angle of the front wheel may be increased, at least temporarily, to a higher value $\alpha_{1,max,incr}$ provided that the rear wheel has a small slip angle, in particular provided that the slip angle of the rear wheel remains less than a reduced predetermined value $\alpha_{2,max,decr}$ of the maximum allowable slip angle. $\alpha_{1,max,incr}$ may be, for example, at least 2-6% greater than $\alpha_{1,max}$; $\alpha_{2,max,decr}$ may be, for example, at least 0.1-1.5% less than $\alpha_{2,max}$.

Distinguishing between critical and noncritical driving situations may thus be improved, in particular in the case of traveling over short roadway areas having a reduced friction coefficient.

According to one specific embodiment, in the method it is also ascertained whether a brake of the two-wheeled motor vehicle is actuated, and when an actuation of the brake is recognized, predetermined value $\Phi_{max}$ of the maximum allowable roll angle is reduced to a lower value $\Phi_{max,decr}$ of the maximum allowable roll angle.

This is based on the observation that a two-wheeled motor vehicle that is negotiating a curve, and is thus in an inclined position, generally resumes an upright position very quickly when the brake is actuated. This could possibly result in the third criterion, namely, exceeding the maximum allowable roll angle $\Phi_{max}$, suddenly no longer being satisfied, so that it would be erroneously assumed that a critical driving situation was no longer present. To avoid this, when it is recognized that the vehicle brake is actuated, the predetermined value of the maximum allowable roll angle may be automatically reduced to a lower value $\Phi_{max,decr}$. Lower value $\Phi_{max,decr}$ may be, for example, at least 30-50% less than $\Phi_{max}$, and may be set, for example, for a limited time period between 100 ms and 1000 ms, or for a time period within which the brake actuation is established.

The recognition of critical driving situations may thus also be improved for braking while negotiating a curve.

According to one specific embodiment, instantaneous slip angle $\alpha_1$, $\alpha_2$ of the front wheel and/or of the rear wheel is ascertained based on a measurement of an instantaneous sideslip angle $\beta$, of the two-wheeled motor vehicle.

A sideslip angle may be understood to mean an angle between the movement direction of the vehicle at the center of gravity and the vehicle longitudinal axis. At high transverse accelerations, the sideslip angle is often valid as a measure for controllability of a vehicle. A sensor system for two-wheeled motor vehicles that is now available, in particular a sensor system equipped with inertial sensors, allows an accurate measurement or at least estimation of an instantaneous sideslip angle of the vehicle. In particular, certain algorithms, some of which are newly developed, allow the instantaneous slip angle of a wheel to be derived or at least estimated, based on an ascertained sideslip angle of the overall two-wheeled motor vehicle. This applies in particular to the rear wheel.

According to one specific embodiment, instantaneous slip angle $\alpha_1$ of the front wheel of a two-wheeled motor vehicle may be ascertained based on a measurement of an instantaneous sideslip angle $\beta$ of the two-wheeled motor vehicle, and taking into account an ascertained instantaneous steering angle $\delta$ of the two-wheeled motor vehicle.

The steering angle, i.e., the angle by which the front wheel of the two-wheeled motor vehicle is turned relative to the vehicle longitudinal axis, has generally not been monitored thus far in two-wheeled motor vehicles, unless active steering dampers are to be actuated in a controlled manner.

However, it has been recognized that, in particular for the recognition of critical driving situations, accurate ascertainment of the instantaneous slip angle or the instantaneous differential slip angle of the front wheel, not only by measuring the sideslip angle of the overall two-wheeled motor vehicle, but also by taking into account the instantaneous steering angle, may be necessary or advantageous. The steering angle may be monitored with a steering angle sensor, for example, so that the instantaneous slip angle of the front wheel may be accurately computed or at least estimated based on data of the steering angle sensor together with data of a sensor system that indicates the sideslip angle.

According to one specific embodiment, the two-wheeled motor vehicle provided herein may therefore include a sensor system, a data memory, a data processing unit, and a signal generation unit. The sensor system is configured for ascertaining instantaneous slip angle $\alpha_1$, $\alpha_2$ of the front wheel and/or of the rear wheel, instantaneous differential slip angle $d\alpha_1$, $d\alpha_2$ of the front wheel and/or of the rear wheel, and instantaneous roll angle $\theta$ of the two-wheeled motor vehicle. The data memory is configured for storing predetermined values $\alpha_{1,max}$, $\alpha_{2,max}$ of maximum allowable slip angles, predetermined values $d\alpha_{1,max}$, $d\alpha_{2,max}$ of maximum allowable differential slip angles, and predetermined value $\Phi_{max}$ of the maximum allowable roll angle. Appropriate values may be ascertained in advance, for example via tests or simulations, and may be stored in the data memory, which may be in nonvolatile form, which may be prior to start-up of the control unit. The data processing unit is configured for comparing the instantaneous slip angle $\alpha_1$, $\alpha_2$ to associated predetermined value $\alpha_{1,max}$, $\alpha_{2,max}$ of a maximum allowable slip angle, for comparing instantaneous differential slip angle $d\alpha_1$, $d\alpha_2$ to associated predetermined value $d\alpha_{1,max}$, $d\alpha_{2,max}$ of a maximum allowable differential slip angle, and for comparing instantaneous roll angle $\Phi$ to predetermined value $\Phi_{max}$ of a maximum allowable roll angle. The signal generation unit is configured for generating the criticality signal when at least one of ascertained instantaneous slip angles $\alpha_1$, $\alpha_2$ is greater than associated predetermined value $\alpha_{1,max}$, $\alpha_{2,max}$ of the maximum allowable slip angle, and at least one of ascertained instantaneous differential slip angles $d\alpha_1$, $d\alpha_2$ is greater than associated predetermined value $d\alpha_{1,max}$, $d\alpha_{2,max}$ of the maximum allowable differential slip angle, and ascertained instantaneous roll angle $\Phi$ is greater than predetermined value $\Phi_{max}$ of the maximum allowable roll angle.

The sensor system may advantageously collect data or sensor signals that allow a conclusion to be drawn concerning an instantaneous driving situation, and based on these data or sensor signals, the data processing unit may then ascertain criteria for the presence of a critical driving situation, taking into account maximum allowable limiting values previously stored in the data memory or temporarily modified limiting values derived therefrom, and may optionally output a corresponding criticality signal via the signal generation unit and transmit it to other vehicle components, for example.

According to one specific embodiment, the sensor system also includes a steering angle sensor for ascertaining an instantaneous steering angle $\delta$ of the front wheel of the two-wheeled motor vehicle, and a sideslip angle sensor for ascertaining an instantaneous sideslip angle $\beta$ of the two-wheeled motor vehicle. The steering angle sensor and the sideslip angle sensor may be configured as separate sensors, or implemented as part of a shared vehicle sensor system. The data processing unit is then configured for deriving instantaneous slip angles $\alpha_1$, $\alpha_2$ and instantaneous differential slip angles $d\alpha_1$, $d\alpha_2$ from the sideslip angles ascertained by the sideslip angle sensor, taking into account steering angles ascertained by the steering angle sensor. Taking into account instantaneously ascertained steering angles may allow particularly accurate and reliable recognition of critical driving situations.

According to one specific embodiment, the two-wheeled motor vehicle also includes a so-called safety device. The safety device may be configured to improve safety of the two-wheeled motor vehicle or of the rider by its activation. For example, the safety device may be a traction control system, an anti-lock braking system, a device for generating additional stabilizing lateral forces, a device for increasing contact forces, a device for outputting warning signals, a device for activating safety units, and/or a device for outputting an electronic assistance call. In this case, the controller may be configured to activate the safety device with the aid of the generated criticality signal. In this way, when a critical driving situation is recognized by activation of the safety device, for example an active intervention into the driving dynamics of the two-wheeled motor vehicle may be made in order to stabilize same, or other safety-enhancing measures may be taken.

It is pointed out that some of the possible features and advantages of the present invention are described herein with reference to different specific embodiments, in particular sometimes with reference to a method for recognizing critical driving situations and sometimes with reference to an appropriately configured control unit or two-wheeled motor vehicle. Those skilled in the art recognize that the features may be suitably combined, modified, or exchanged in order to arrive at further specific embodiments of the present invention.

Specific embodiments of the present invention are described below with reference to the appended drawings; neither the drawings nor the description are to be construed as limiting to the present invention.

The figures are schematic and are not true to scale. Identical or functionally equivalent features are denoted by the same reference numerals in the figures.

DETAILED DESCRIPTION

Figure 1:
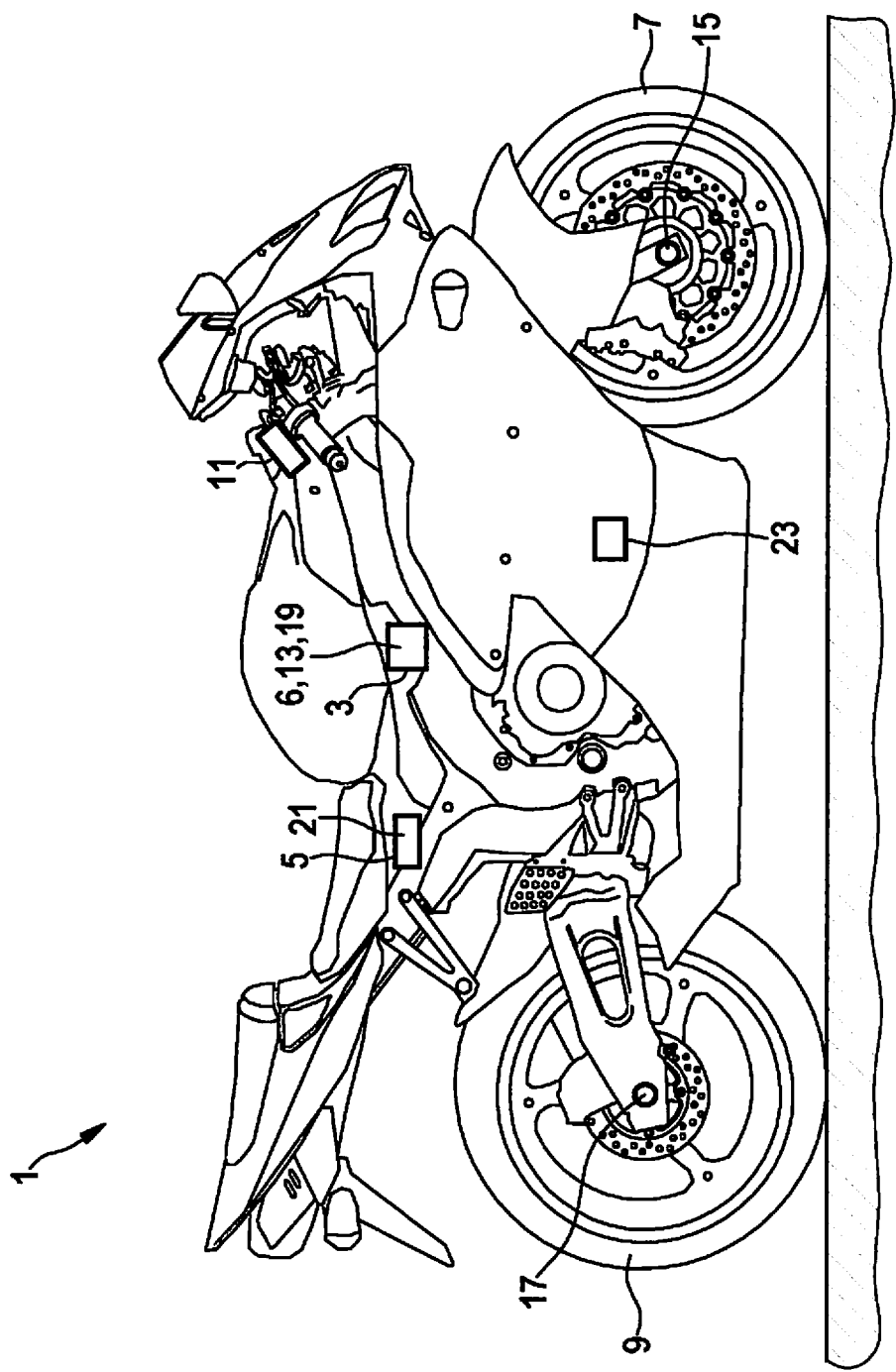
FIG. 1 shows a two-wheeled motor vehicle according to one specific embodiment of the present invention.

FIG. 1 shows a two-wheeled motor vehicle 1 that is configured for carrying out the method provided herein for recognizing critical driving situations, with the aid of a specially configured control unit 3. Two-wheeled motor vehicle 1 includes a sensor system 5, which may be configured in particular in the form of an inertial sensor system, and with the aid of which a data processing unit 6 of control unit 3 is enabled to ascertain instantaneous slip angles of front wheel 7 or of rear wheel 9 of two-wheeled motor vehicle 1, changes in these slip angles over time, and an instantaneous roll angle of two-wheeled motor vehicle 1. In particular the sensor system may be configured for measuring or determining an instantaneous sideslip angle of two-wheeled motor vehicle 1, and may thus act as a sideslip angle sensor 21. In the illustrated example, sensor system 5 is shown as a separate component; however, it may also be integrated into control unit 3. Two-wheeled motor vehicle 1 also includes a steering angle sensor 11, with the aid of which an instantaneous steering angle, at which front wheel 7 is steered, may be determined. In addition, a data memory 13 that is integrated into control unit 3 or configured as a separate component is provided, in which predetermined values of maximum allowable slip angles, maximum allowable values for differential slip angles, and maximum allowable values for the roll angle may be stored. A wheel speed sensor 15, 17 is also provided for front wheel 7 and rear wheel 9, respectively. In addition, a signal generation unit 19 is provided in control unit 3 for outputting a criticality signal when a critical driving situation is recognized. The criticality signal may activate a safety device 23 of the two-wheeled motor vehicle, for example for stabilizing the driving situation.

Figure 2:
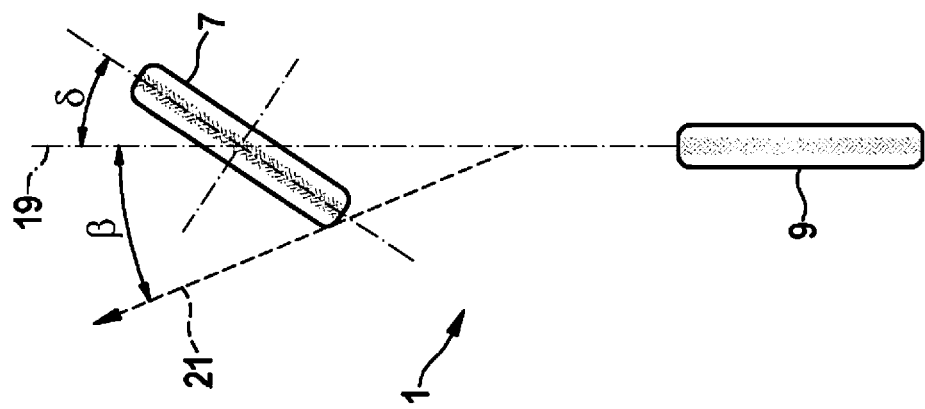
FIG. 2 shows a schematic view, from above, of a two-wheeled motor vehicle for illustrating steering angles and sideslip angles.

The schematic top view from above of two-wheeled motor vehicle 1 illustrated in FIG. 2 shows a steering angle δ between a vehicle longitudinal axis 19 and a direction in which front wheel 7 is steered at that moment, and a sideslip angle β, between vehicle longitudinal axis 19 and a movement direction 21 at the center of gravity of two-wheeled motor vehicle 1. A slip angle α between a velocity vector at the wheel contact point and an intersection line between the wheel center plane and the roadway plane may be ascertained or estimated with knowledge of instantaneous steering angle δ and instantaneous sideslip angle β.

It is pointed out that the angles in question are illustrated for simplified representation of an upright two-wheeled motor vehicle 1, and in particular may be illustrated differently for a two-wheeled motor vehicle 1 that is negotiating a curve.

Figure 3:
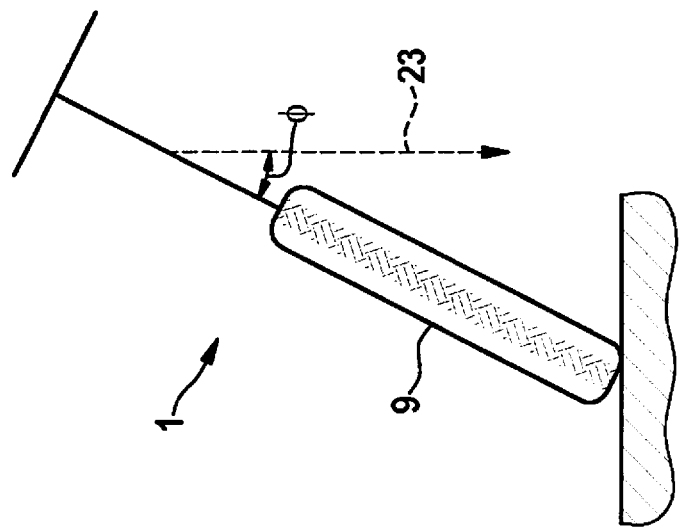
FIG. 3 shows a schematic view, from the front, of a two-wheeled motor vehicle for illustrating a roll angle.

The schematic front view of two-wheeled motor vehicle 1 illustrated in FIG. 3 shows a roll angle Φ between two-wheeled motor vehicle 1 and a vertical direction 23.

A method, i.e., a recognition algorithm, has been developed that is able to reliably distinguish between stable and unstable driving states. For this purpose, slip angle α and differential slip angle dα of at least one of the wheels, as well as roll angle Φ, are continuously or periodically monitored and compared to associated maximum allowable values, and when the limiting values for all three variables are simultaneously exceeded, the presence of instability is assumed and a criticality signal is output.

In the event of an instability, a further distinction is made concerning whether a roadway having a homogeneous friction coefficient is present, or whether the roadway has locations with a lower friction coefficient (low-μ patches). This may be important, since it determines the sequence in which front wheel 7 and rear wheel 9 become unstable. On roadways having a homogeneous friction coefficient, an instability generally occurs at rear wheel 9 first. Shortly thereafter, front wheel 7 becomes unstable and quickly turns, based on the steering kinematics, in the direction of the inner side of the curve.

When traveling on a roadway having low-μ patches, front wheel 7 crosses a slick location first, followed by rear wheel 9. As a function of the length of the low-μ patch and the difference in friction coefficients between roadway surfaces that have good traction and that are slick, once again due to the steering kinematics, moderate to large steering angles and slip angles occur at front wheel 7, while rear wheel 9 has instability only in long low-μ patches having a large difference in friction coefficients. Moderately large front wheel slip angles $\alpha_1$ do not always result in a fall, since front wheel 7 is often able to restabilize itself in the transition from the slick roadway surface to the roadway surface with good traction. However, the brief instability may result in a faulty recognition, and thus, unnecessary triggering of an intervention or a safety measure. To avoid the faulty recognition, intervention threshold $\alpha_{1,max}$ is increased, at least temporarily, to a larger value $\alpha_{1,max,incr}$, provided that the rear axle has low slip angles $\alpha_2$ that are less than a reduced value $\alpha_{2,max,decr}$.

In the event of a longer low-μ patch with a large difference in friction coefficients, rear wheel 9 also becomes unstable. It may then be advantageous to reduce the intervention threshold for $\alpha_{1,max}$ back to the normal value.

Faulty intervention for brief instabilities is thus prevented by suitable selection of parameters; however, for longer instabilities a necessary intervention is triggered. The instability recognition at the front wheel 7 may thus also take place as a function of driving dynamic variables of rear wheel 9.

To distinguish between unstable and stable driving states, it may also be advantageous to observe how quickly a slip angle $\alpha_1$, $\alpha_2$ increases at front and/or rear axle 7, 9. Simulations have shown that slip angles $\alpha_1$, $\alpha_2$ may safely reach maximum values $\alpha_{1,max}$, $\alpha_{2,max}$ and even slightly exceed them, provided that the rate of the increase is low. For this reason, a linkage of slip angles $\alpha_1$, $\alpha_2$ to differential slip angles $d\alpha_1$, $d\alpha_2$ is implemented in the instability recognition logic system described herein.

However, considerable slip angles $\alpha_1$, $\alpha_2$ may occur even during straight-ahead driving, due to ruts or when traveling over gravel or rough roads. The additional querying of motorcycle roll angle Φ allows a recognition of the "unstable" state only when high transverse dynamics are also present. Faulty recognitions are thus avoided.

As the result of braking operations at a high inclined position at front and/or rear axle 7, 9, two-wheeled motor vehicle 1 generally resumes an upright position relatively quickly. In this case, the threshold value of roll angle Φ is reduced. It may therefore be advantageous to recognize a braking operation, for example by querying brake light switches, or by brake pressure sensors if present, and to subsequently reduce value $\Phi_{max}$, at least temporarily, to a lower value $\Phi_{max,decr}$, since necessary interventions would otherwise be prevented.

One specific embodiment of a method described herein, i.e., an instability recognition logic system, as may be implemented in software and/or in hardware in a control unit, may therefore also be described by formulas, as follows:

Instability of rear wheel when: $|\alpha_2|>\alpha_{2,max}$ AND $|d\alpha_2|>d\alpha_{2,max}$ AND $|\Phi|>\Phi_{max}$ Instability of front wheel when: $|\alpha|>\alpha_{1,max}$ AND $|d\alpha_1|>d\alpha_{1,max}$ AND $|\Phi|>\Phi_{max}$ Changed parameters for low-μ patch situations:

If $|\alpha_2|<\alpha_{2,max,decr}$, then $\alpha_{1,max}$ is increased to $\alpha_{1,max,incr}$ When the front and/or rear brake are/is actuated, the following applies:

$\Phi_{max}$ is decreased to $\Phi_{max,decr}$

Variables:

|Φ|=absolute value of the motorcycle roll angle $\alpha_1$=front wheel slip angle $\alpha_2$=rear wheel slip angle $d\alpha_1$=differential of $\alpha_1$ $d\alpha_2$=differential of $\alpha_2$ Parameters:

$\Phi_{max}$ [rad] value applies for unbraked driving maneuvers $\Phi_{max,decr}$ [rad] reduced value for braked driving maneuvers $\alpha_{1,max}$ [rad] maximum allowable front axle slip angle $\alpha_{2,max}$ [rad] maximum allowable rear axle slip angle $\alpha_{1,max,incr}$ [rad] increased value at front wheel for low-μ patch situations $\alpha_{2,max,decr}$ [rad] reduced value at rear wheel for low-μ patch situations $d\alpha_{1,max}$ [rad/s] maximum allowable differential front axle slip angle $d\alpha_{2,max}$ [rad/s] maximum allowable differential rear axle slip angle.

In conclusion, it is noted that terms such as "having", "including", etc., do not exclude other elements or steps, and terms such as "a" or "an" do not exclude a plurality. Reference numerals in the claims are not to be construed as limiting.

What is claimed is:

1. A method for recognizing critical driving situations of a two-wheeled motor vehicle that includes a front wheel and a rear wheel, the method comprising:
   ascertaining an instantaneous slip angle and an instantaneous differential slip angle of the front wheel and/or an instantaneous slip angle and an instantaneous differential slip angle of the rear wheel;
   ascertaining an instantaneous roll angle of the two-wheeled motor vehicle;
   comparing the ascertained slip angles and the differential slip angles to respective corresponding predetermined values of maximum allowable slip angles or maximum allowable differential slip angles;
   comparing the instantaneous roll angle to a predetermined value of a maximum allowable roll angle; and
   generating a criticality signal when at least one of the instantaneous slip angles is greater than the associated predetermined value of the maximum allowable slip angle, at least one of the instantaneous differential slip angles is greater than the associated predetermined value of the maximum allowable differential slip angle, and the instantaneous roll angle is greater than the predetermined value of the maximum allowable roll angle.

2. The method of claim 1, wherein the instantaneous slip angle and the instantaneous differential slip angle are ascertained for both the front wheel and the rear wheel, and the predetermined value of the maximum allowable slip angle of the front wheel is increased to a higher value of a maximum allowable slip angle of the front wheel, provided that the ascertained instantaneous slip angle of the rear wheel is smaller than a reduced predetermined value of the maximum allowable slip angle of the rear wheel.

3. The method of claim 1, further comprising:
   ascertaining whether a brake of the two-wheeled motor vehicle is actuated, and when an actuation of the brake is recognized, the predetermined value of the maximum allowable roll angle is reduced to a lower value of the maximum allowable roll angle.

4. The method of claim 1, wherein the instantaneous slip angle of the front wheel and/or of the rear wheel is ascertained based on a measurement of an instantaneous sideslip angle of the two-wheeled motor vehicle.

5. The method of claim 1, wherein the instantaneous slip angle of the front wheel is ascertained based on a measurement of an instantaneous sideslip angle of the two-wheeled motor vehicle, and taking into account an ascertained instantaneous steering angle of the two-wheeled motor vehicle.

6. A control unit for a two-wheeled motor vehicle, comprising:
   a controller for recognizing critical driving situations of the two-wheeled motor vehicle, which includes a front wheel and a rear wheel, and configured to perform the following:
      ascertaining an instantaneous slip angle and an instantaneous differential slip angle of the front wheel and/or an instantaneous slip angle and an instantaneous differential slip angle of the rear wheel;
      ascertaining an instantaneous roll angle of the two-wheeled motor vehicle;
      comparing the ascertained slip angles and the differential slip angles to respective corresponding predetermined values of maximum allowable slip angles or maximum allowable differential slip angles;
      comparing the instantaneous roll angle to a predetermined value of a maximum allowable roll angle; and
      generating a criticality signal when at least one of the instantaneous slip angles is greater than the associated predetermined value of the maximum allowable slip angle, at least one of the instantaneous differential slip angles is greater than the associated predetermined value of the maximum allowable differential slip angle, and the instantaneous roll angle is greater than the predetermined value of the maximum allowable roll angle.

7. A two-wheeled motor vehicle, comprising:
   a control unit for recognizing critical driving situations of the two-wheeled motor vehicle, which includes a front wheel and a rear wheel, and configured to perform the following:
      ascertaining an instantaneous slip angle and an instantaneous differential slip angle of the front wheel and/or an instantaneous slip angle and an instantaneous differential slip angle of the rear wheel;
      ascertaining an instantaneous roll angle of the two-wheeled motor vehicle;
      comparing the ascertained slip angles and the differential slip angles to respective corresponding predetermined values of maximum allowable slip angles or maximum allowable differential slip angles;
      comparing the instantaneous roll angle to a predetermined value of a maximum allowable roll angle; and
      generating a criticality signal when at least one of the instantaneous slip angles is greater than the associated predetermined value of the maximum allowable slip angle, at least one of the instantaneous differential slip angles is greater than the associated predetermined value of the maximum allowable differential slip angle, and the instantaneous roll angle is greater than the predetermined value of the maximum allowable roll angle.

8. The two-wheeled motor vehicle of claim 7, further comprising:
   a sensor system to ascertain the instantaneous slip angle of the front wheel and/or of the rear wheel, the instantaneous differential slip angle of the front wheel and/or of the rear wheel, and the instantaneous roll angle of the two-wheeled motor vehicle;
   a data memory to store predetermined values of maximum allowable slip angles, predetermined values of maximum allowable differential slip angles, and the predetermined value of the maximum allowable roll angle;
   a data processing unit to compare the instantaneous slip angle to the associated predetermined value of a maximum allowable slip angle, for comparing the instantaneous differential slip angle to the associated predetermined value of a maximum allowable differential slip angle, and for comparing the instantaneous roll angle to the predetermined value of a maximum allowable roll angle; and a signal generation unit to generate the criticality signal when at least one of the ascertained instantaneous slip angles is greater than the associated predetermined value of the maximum allowable slip angle, and at least one of the ascertained instantaneous differential slip angles is greater than the associated predetermined value of the maximum allowable differential slip angle, and the ascertained instantaneous roll angle is greater than the predetermined value of the maximum allowable roll angle.

9. The two-wheeled motor vehicle of claim 8, wherein the sensor system includes a steering angle sensor for ascertaining an instantaneous steering angle of the front wheel of the two-wheeled motor vehicle, and a sideslip angle sensor for ascertaining an instantaneous sideslip angle of the two-wheeled motor vehicle, and wherein the data processing unit is configured for deriving the instantaneous slip angles and the instantaneous differential slip angles based on sideslip angles ascertained by the sideslip angle sensor, taking into account steering angles ascertained by the steering angle sensor.

10. The two-wheeled motor vehicle of claim 7, further comprising:

a safety device which includes one of: a traction control system, an anti-lock braking system, a device for generating additional stabilizing lateral forces, a device for increasing contact forces, a device for outputting warning signals, a device for activating safety units, and/or a device for outputting an electronic assistance call;

wherein the controller is configured to activate the safety device with the generated criticality signal.

* * * * *